Oct. 12, 1965   L. ACKLIN   3,210,943
NUCLEAR POWER SYSTEM
Filed Aug. 9, 1961   2 Sheets-Sheet 1
Fig. 1
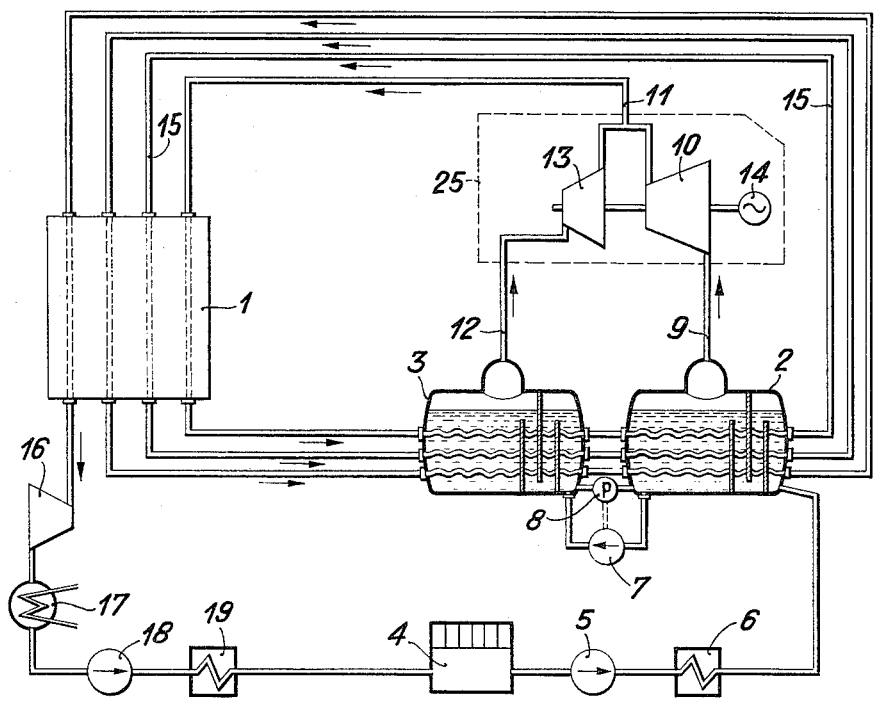
Fig. 3
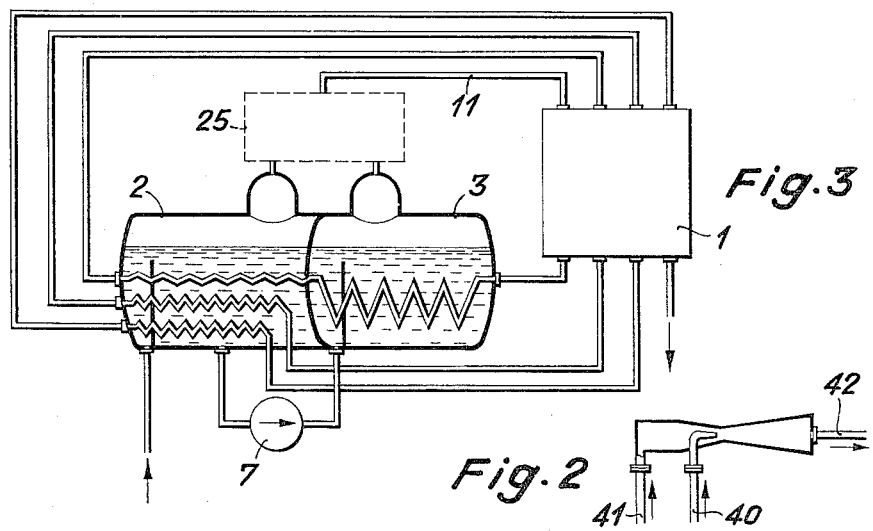
Fig. 2
Inventor:
Leo Acklin
BY
Pennie Edmonds Morton Taylor & Roy
ATTORNEYS Oct. 12, 1965     L. ACKLIN     3,210,943
NUCLEAR POWER SYSTEM Filed Aug. 9, 1961     2 Sheets-Sheet 2

Inventor:
Leo Acklin
BY
ATTORNEYS

United States Patent Office 3,210,943
Patented Oct. 12, 1965

3,210,943
NUCLEAR POWER SYSTEM
Leo Acklin, Pratteln, Switzerland, assignor to Sulzer Freres, Societe Anonyme, Winterthur, Switzerland, a Swiss company
Filed Aug. 9, 1961, Ser. No. 130,318
Claims priority, application Switzerland, Aug. 19, 1960, 9,449/60
13 Claims. (Cl. 60—64)

The present application is a continuation-in-part of my copending application Serial No. 16,847, filed March 22, 1960.

This invention relates to steam power plants, and more particularly to such plants including a source of heat, such as a nuclear reactor, from which the heat is extracted for vaporization of the working substance (typically water) by means of the vaporized fraction of the working substance itself, in flow from the vapor phase of a boiler through a steam channel which leads successively to the heat source and through the boiler (for delivery of heat to the latter) and thence ultimately to a load such as a turbine. Preferably the vaporized working substance makes a number of circuits or cycles in heat exchange relation with the source of heat and the boiler successively for transfer of heat from the source to the boiler, before being delivered to the load.

The invention provides a power plant of this type including plural evaporators operating at different pressures, and means to bring the steam therefrom to a common pressure, with minimum losses. By the provision of plural evaporators operating at different pressures there is maximized the amount of heat which is transferred per cycle from the heat source to the working substance which is in liquid form yet to be vaporized.

In my copending application Serial No. 16,847 filed March 22, 1960 and assigned to the assignee hereof, and now abandoned, there are disclosed method and apparatus for extracting heat from a nuclear reactor by means of a vaporizable working substance. In accordance with the disclosure of that application, the working substance is brought to a high pressure while in the liquid state, being forced by a pump into a boiler or evaporator for this purpose. There it is vaporized by means of heat carried by already vaporized working substance, which has passed through a cooling coil of the reactor. The newly vaporized working substance then flows, while in the vapor state, toward points of successively lower pressure in consecutive passes through cooling coils of a reactor (where it is heated) and through heating coils of the boiler, where it is cooled, giving up some of its heat to the liquid working substance in the boiler in order to vaporize that liquid working substance. In addition, as disclosed in that application, supplementary means are provided to cool the working substance after at least one of its passages through the reactor and prior to at least one subsequent passage through the reactor in order to maximize the heat which the working substance can extract from the reactor during such subsequent passage therethrough.

While the invention of the present application, like that of Serial No. 16,847, may be practiced with other working substances, the invention will for brevity hereinafter be described in terms of plants employing water as the working substance. The terms water and steam, as used in both the description and claims of the present application, are to be understood as including the liquid and vapor phases respectively of any suitable vaporizable working substance.

In a plant such as that disclosed in said copending application, and whether or not such supplementary cooling means are provided, it is desirable to employ, for the generation of additional saturated steam, as high a proportion as possible of the heat available upon recooling of previously generated steam when it is brought into heat exchange relation with the working substance in the liquid phase, i.e., in the boiler. For the efficiency of the plant therefore it is very important for this heat exchange to be performed in a manner as advantageous thermodynamically as possible.

In the power plant according to the present invention, two or more evaporators are used instead of one, traversed successively for vaporization of liquid water therein by previously vaporized steam which has after such vaporization passed in heat exchange relation with the heat source. The various evaporators operate at different pressure levels, and the steam arriving from the heat source is passed first through the evaporator operated at higher pressure and then in heat exchange relation with the evaporator operated at lower pressure. Further, means are provided to bring to a common pressure the steam delivered by the separate evaporators.

Since the evaporator (hereinafter the "first" evaporator) which is first traversed by the steam superheated from its contact with the heat source operates at a higher saturated steam temperature because of the higher pressure in that evaporator, the heat which is exchanged in that first evaporator is available at a higher temperature level than the heat which is available on further cooling of that steam in the evaporator next traversed thereby. Hence a thermodynamic process involving delivery of energy can be performed between such first evaporator and the second evaporator (or, more generally, any succeeding evaporator). Such energy can be used in any desired way. For instance, it can be used to drive a compressor which raises the pressure of the steam delivered by the second evaporator to a value between the pressure level of the first evaporator and the pressure level of the second evaporator. Because of the relatively low temperature in the second evaporator, therefore, the superheat of the steam can be used down to a lower temperature. An increased quantity of steam is thus made available before the first passage through the reactor. The required number of circuits through the evaporators and reactor is reduced. This reduces the total pressure drop between the first evaporator and the load. Plant efficiency is thereby increased, and handling of the steam outside the reactor core is simplified.

The invention will now be further described with reference to the accompanying drawings in which:

FIG. 1 is a diagrammatic representation of a power plant according to the invention employing a turbo-compressor set for equalization of the pressures of the steam from the two evaporators;

FIG. 2 is a diagram of a thermo-compressor which may be used for equalization of steam pressures in place of the turbo-compressor set of FIG. 1;

Figure 4:
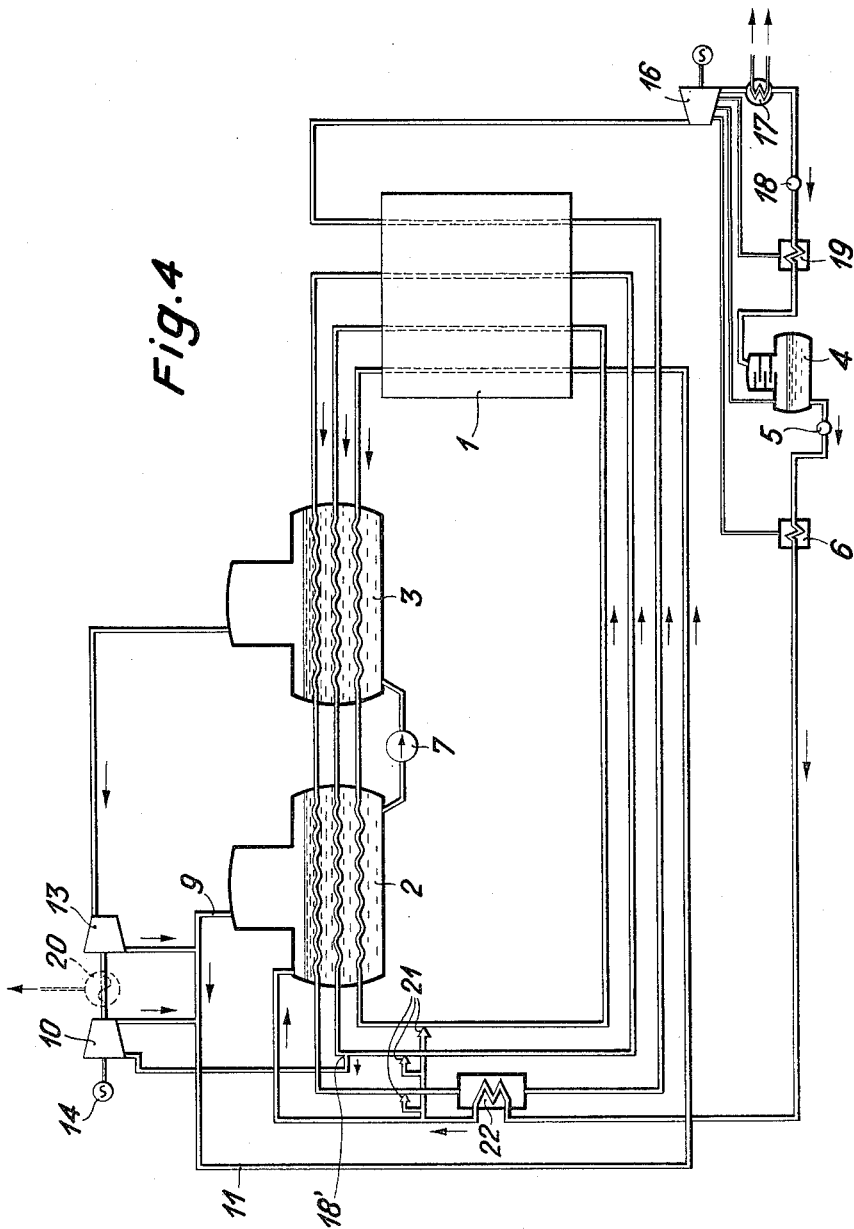

FIG. 3 is a diagram of another embodiment of the invention in which, on some of the circuits of the steam between the heat source and the liquid phase of the working substance to be vaporized, the steam delivers heat to less than all of the evaporators provided; and FIG. 4 is a diagram of still another embodiment of the invention wherein a part of the steam passing through the channel which leads from the evaporators to the load is tapped off part way down that channel and returned through the agency of a compressor to the upstream end of that channel.

The power plant shown in FIG. 1 comprises a reactor 1 traversed in a number of passages by steam delivered by evaporators 2 and 3. The two evaporators are supplied with feed water from a feed water tank 4 through the agency of a pump 5 and through a preheater 6, a pump 7 maintaining a desired pressure difference between the two evaporators with a higher pressure in evaporator 3 than in evaporator 2. The pump 7 can be controlled by a pressure senser 8 which responds to the pressure difference between the two evaporators. The steam delivered by the evaporator 2 passes through line 9 to compressor 10 and thence to a common line 11 into which steam is supplied from the evaporator 3 through line 12 and turbine 13. Preferably, the compressor and turbine are disposed on a common shaft; also disposed thereon is a motor-generator 14 which equalizes out any power differences which may occur. The dash line box 25 designates generally the turbo-compressor set shown therewithin, by means of which the steam from evaporators 2 and 3 is delivered at a common pressure to line 11. From the common line 11 the steam flows in a first passage through the reactor 1 where it is superheated. It is then recooled in the two evaporators, and returns to the reactor through the line 15 where it is superheated again in a second passage, and then recooled again in the evaporators. After a number of such passages the superheated steam is supplied as live steam to a load turbine 16. The turbine 16 is followed in conventional manner by a condenser 17, whence condensate is returned, by way of a condensate pump 18 and preheater 19, to the feed water tank 4.

Within dash line box 25, the saturated steam from the evaporator 3 is expanded in the turbine 13, performing work as it does so, and passes as wet steam to a point of junction where it is combined with the steam which comes from the evaporator 2 and which has been compressed in the compressor 10 and thereby superheated. In practice, conditions are such that the mixing of the wet steam with the superheated steam leads to substantially saturated steam at a common pressure level $p_m$. If only a single evaporator operating at the pressure $p_m$ were to be used, the corresponding saturated steam temperature would be higher than the saturated steam temperature prevailing in the evaporator 2. By provision of the second evaporator, therefore, the steam after superheating in the reactor 1 can be cooled more—i.e., more heat can be removed from the steam per circuit through the reactor heat source and evaporating means. Consequently, for each passage of the coolant through the reactor, an increased number of cooling channels can be provided in parallel with one another so that additionally for this reason the total heat produced in the reactor can be removed with fewer circuits. To take a concrete example, with evaporator 3 operating at a pressure of 80 atmospheres and a saturated steam temperature of 293° C., and with evaporator 2 operating at a pressure of 50 atmospheres and a saturated steam temperature of 262° C., steam is fed into line 11 at a pressure of 60 atmospheres and a temperature of 275° C. If only a single evaporator were provided, it would have to be operated at a pressure of 60 atmospheres and a saturated steam temperature of 275° C. to achieve the same conditions. The use of two evaporators therefore means that between passes through the reactor the steam can be recooled through a temperature difference greater by 13° C. A calculation will show that the number of circuits for a given reactor can thereby be reduced by about 20%, with a corresponding reduction in total pressure drop, so that the steam is available at higher pressure at the inlet to the turbine.

To maximize the quantity of heat removed from the reactor by the heat vehicle at each passage therethrough, the steam should be cooled between passages so as to be at the temperature of saturated steam upon return to the reactor. This cannot be satisfactorily achieved simply by recooling in one evaporator, for the reason, if for no other, that flow resistance in the steam channel leading from evaporator to load will cause the steam pressure in that channel to decrease, after a sufficient number of circuits through the heat source and evaporator, considerably below the value prevailing in that channel upon its first entry into heat exchange relation with the reactor. The saturation temperature of the steam in that channel will therefore be lower than the temperature of the saturated steam in the evaporator. In accordance with the present invention, the cooling of the steam between its successive passages through the reactor is increased by the provision of plural evaporators operated at different pressures, with the help of the pressure differential means 7 and 8 and of the pressure equalizing means 25. Other means to increase the cooling may be provided if desired in addition to the plural evaporators operated at unlike pressures. These other means may, for instance, be those disclosed in said copending application, such as including the feed water preheating in the path of the steam between evaporator and load, or injection of water at one or more points into that steam channel. That application discloses a number of different systems for cooling the steam between its passages in heat exchange relation with the heat source and for controlling such cooling in dependence upon temperature and quantity of steam flow, and it also gives examples of how the heat of the moderator can be used, in the case of a nuclear heat source. The means disclosed in that copending application can be employed for cooling in the power plant of the present invention supplementary to that available with plural evaporators.

Instead of the turbine-compressor set 25 shown in FIG. 1, the thermocompressor diagrammatically illustrated in FIG. 2 may be used to equalize the pressure between the two evaporators 2 and 3 of FIG. 1. With the device of FIG. 2 substituted for the turbo-compressor 25 in FIG. 1, lines 41, 40 and 42 of FIG. 2 are connected respectively to lines 12, 9 and 11 of FIG. 1. With this connection, the resultant pressure in the diffuser of the apparatus of FIG. 2 will be above the pressure of the evaporator 2, and the steam is supplied from the exit port 42 through line 11 (FIG. 1) for the first passage of the steam through the reactor.

FIG. 3 illustrates another embodiment of the invention, particularly advantageous when, as in the plant disclosed in the said copending application, the steam issues from its various passages through the reactor at different superheat temperatures. In the embodiment of FIG. 3, the steam after passage through the reactor is sent through heating coils in one or in both evaporators according to its superheat temperature. The various quantities of heat taken up by the steam during its different passages through the reactor can thus be delivered to one or to both of the evaporators. Of course, the recooling in the various circuits can be further controlled by the injection of liquid working substance, the quantity which is injected being controlled in dependence upon the temperature of the steam.

In the plant shown in FIG. 4, steam produced in the evaporator 3 is expanded directly in the turbine 13, with performance of work, to the pressure level of the evaporator 2. The power delivered by the turbine 13 can be converted directly into useful power by an electric generator 20 shown in dotted lines. Preferably however the turbine 13 drives a compressor 10 by means of which steam tapped from the steam channel 11 at a point 18', after two complete circuits through the reactor and evaporators, is raised to the pressure of the evaporator 2 at the inlet end of the steam channel 11 from which it flows to the reactor together with newly vaporized steam from both of the evaporators 2 and 3, the newly vaporized steam from evaporator 3 having however already passed through turbine 13. The tapping point 18' is selected at a location where the working substance has already performed a number of circuits through the reactor and evaporators so that its pressure level has dropped considerably because of flow resistances. The quantity of steam removed at 18' can be controlled by a distributing value. Preferably, the proportion returned to compressor 10 is so chosen that the power required to operate the compressor 10 can just be provided by the turbine 13. Alternatively, and as shown in FIG. 1, a motor-generator 14 can be coupled with the turbine-compressor set to compensate for any power differences. The system of steam return just described increases the total quantity of steam present at the start of the steam channel, and so an increased number of cooling channels can be connected in parallel with one another for each passage of this increased quantity of steam, with the result of a reduction in the total number of circuits. FIG. 4 shows other ways of recooling the working substance, such as water injectors 21 and feed water preheating in a heat exchanger 22. Also, steam can be bled from the turbine 16 for condensate and feed water preheating. Alternatively, the turbo-compressor set 25 shown in FIG. 1 may be replaced by an externally powered compressor which compresses the steam from the lower-pressure evaporator to the pressure operative in the other evaporator.

While the invention has been described herein in terms of a number of preferred embodiments, the invention itself is not limited thereto. Various changes may be made in the embodiments described without departing from the invention, for example by the use of other means than those described to bring to a common pressure, for introduction into the steam channel, the steam from the various evaporators or boilers. The scope of the invention is rather set forth in the appended claims.

I claim:

1. A power plant comprising a source of heat, a plurality of evaporators, means to maintain a difference in pressure between said evaporators, a steam channel extending in heat exchange relation with said source and thereafter with said higher and lower pressured evaporators successively, and means to connect said evaporators to said channel upstream of said source.

2. A power plant comprising a source of heat, a plurality of evaporators, means to maintain a difference in pressure between said evaporators, a steam channel extending in heat exchange relation with said source and thereafter with said higher and lower pressured evaporators successively, and means to bring to a common pressure steam from said evaporators and to supply said last-named steam to said channel upstream of said source.

3. A power plant comprising a nuclear source of heat, a plurality of evaporators, a feed pump for the supply of liquid working substance to one of said evaporators, means connecting the liquid phases of said evaporators, said connecting means tending to maintain a difference in pressure between said evaporators, a steam channel extending in heat exchange relation with said source and with the higher and lower pressured ones of said evaporators successively, outlet conduits from the vapor zones of said evaporators, and means to join said outlet conduits to said steam channel while preserving the pressure difference between said evaporators.

4. A power plant comprising a nuclear source of heat, a plurality of evaporators, a feed pump for the supply of liquid working substance to the one of said evaporators operating at lower pressure, means connecting the liquid phases of said evaporators, said connecting means tending to maintain a difference in pressure between said evaporators, a steam channel extending in heat exchange relation with said source and with the higher and lower pressured ones of said evaporators successively, outlet conduits from the vapor zones of said evaporators, and means to join said outlet conduits to said steam channel while preserving the pressure difference between said evaporators.

5. A power plant comprising a source of heat, a plurality of evaporators, means to maintain a difference in pressure between said evaporators, a steam channel extending in heat exchange relation with said source and thereafter with said higher and lower pressured evaporators successively, means to expand the steam from the higher-pressured of said evaporators to the pressure of said lower-pressured evaporator and to recover energy from the steam so expanded, and means to deliver to said channel the steam so expanded and steam from the lower-pressured of said evaporators.

6. A steam power plant comprising a nuclear source of heat, at least two boilers, means to supply a liquid working substance to one of said boilers, pump means connected between the liquid phase of said one boiler and the liquid phase of the other of said two boilers to maintain the pressure in said other boiler higher than the perssure in said one boiler, a steam channel extending through said source and through said other and one boilers successively and thence ultimately to a load, means to expand to a lower pressure steam from said other boiler and to raise to a higher pressure with the aid of energy delivered upon such expansion steam from said one boiler, said last-named pressures being equal, and means connecting to said channel steam from said other and one boilers at said lowered and raised pressures respectively.

7. A steam power plant comprising a nuclear source of heat, at least two boilers, means to supply water under pressure to said boilers, means to maintain the pressure in a first one of said two boilers higher than in the second of said two boilers, a steam channel extending in heat exchange relation with said source and thereafter with said first and second boilers successively and thence ultimately to a load, and a turbo-compressor having the inlets to its turbine and compressor portions connected respectively to the vapor phases of said first and second boilers and having the outlets of said portions joined to said steam channel.

8. A steam power plant according to claim 7 including an electric motor-generator coupled to said turbo-compressor.

9. A steam power plant comprising a nuclear source of heat, at least two boilers, means to supply water under pressure to said boilers, means to maintain the pressure in a first one of said two boilers higher than in the second of said two boilers, a steam channel extending in heat exchange relation wtih said source and thereafter with said first and second boilers successively and thence ultimately to a load, and a thermocompressor having its high and low pressure inlets connected respectively to the vapor phases of said first and second boilers and its outlet connected to said steam channel.

10. A steam power plant comprising a nuclear source of heat, at least two boilers, means to supply water under pressure to said boilers, means to maintain the pressure in a first one of said two boilers higher than in the second of said two boilers, a steam channel extending in heat exchange relation with said source and thereafter with said first and second boilers successively and thence ultimately to a load, and a turbo-compressor having its turbine inlet connected to the vapor phase of said first boiler, its turbine outlet connected to the vapor phase of said second boiler, and the inlet and outlet of its compressor connected to points in said steam channel respectively downstream and upstream of at least one passage of said steam channel in heat exchange relation with said reactor.

11. A power plant comprising a source of heat, at least two boilers, means to maintain a difference in pressure between said boilers, a steam channel extending through plural heat exchange cycles with said source and boilers and thence to a load, and means to bring to a common pressure steam from said boilers and to deliver said steam to said channel upstream of said cycles, each of said cycles passing said channel in heat exchange relation with said source and with at least one of said boilers, at least two of said cycles passing said channel in heat exchange relation with unlike numbers of said boilers.

12. A power plant comprising a source of heat, at least two evaporators, means to maintain a difference in pressure between said two evaporators, a steam channel extending in heat exchange relation with said source and thereafter successively with said two evaporators and with said source and thence ultimately to a load, and means to bring to a common pressure steam from both of said two evaporators and to supply said steam at a common pressure to said channel upstream of its first passage in heat exchange relation with said source.

13. A power plant comprising a source of heat, at least two evaporators, means to supply a liquid working substance to said evaporators under pressure, means to maintain a difference in pressure between said two evaporators, a steam channel extending through plural cycles of heat exchange relationship with said source and with the higher and lower-pressured of said evaporators successively, means adapted to connect said steam channel to a load at the outlet end of said cycles, and means to bring to a common pressure steam from both of said two evaporators and to supply said steam at a common pressure to said channel upstream of at least two passages of said channel in heat exchange relation with said source.

References Cited by the Examiner

UNITED STATES PATENTS

| 2,957,815 | 10/60 | Pacault et al. | 204—193.2 |

FOREIGN PATENTS

| 555,598 | 3/57 | Belgium. |
| 568,233 | 6/58 | Belgium. |
| 1,189,724 | 3/59 | France. |
| 5,799 | 1911 | Great Britain. |
| 778,941 | 7/57 | Great Britain. |

OTHER REFERENCES

Proceedings of the Second United Nations International Conference on the Peaceful Uses of Atomic Energy, vol. 8, part 1, United Nations, 1958, pages 401, 402.

JULIUS E. WEST, *Primary Examiner.*

REUBEN EPSTEIN, *Examiner.*